Oct. 18, 1955
W. F. HARDER
2,720,877
GARBAGE COOKING VEHICLE
Filed June 19, 1953
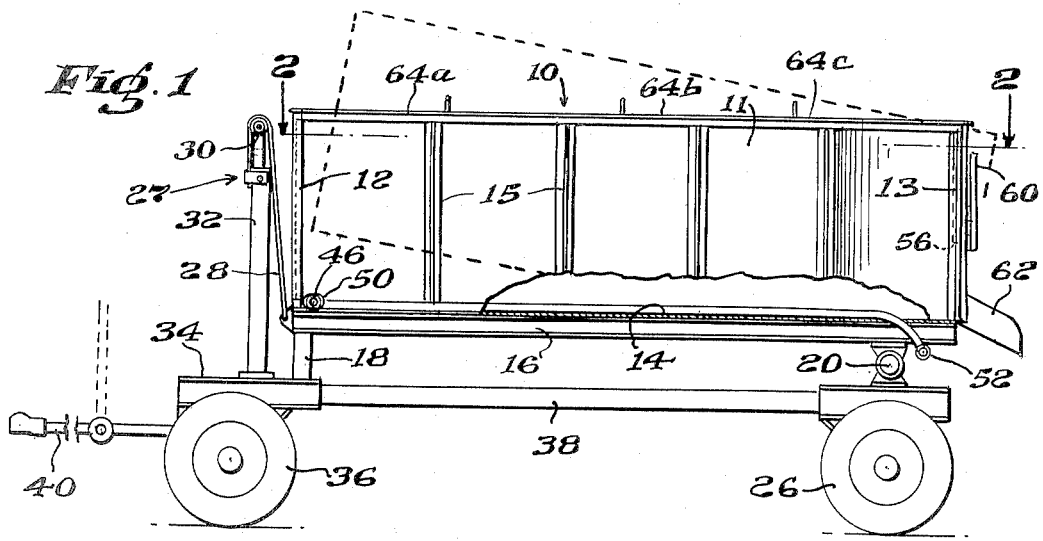
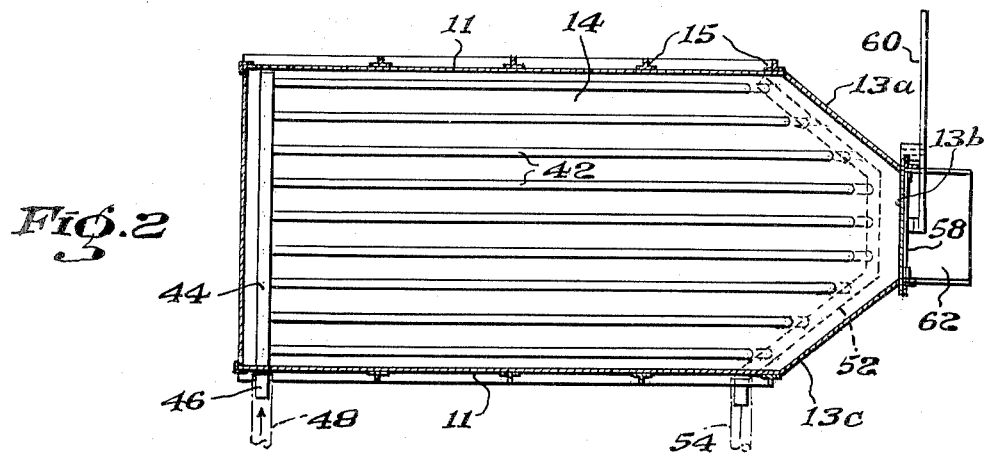
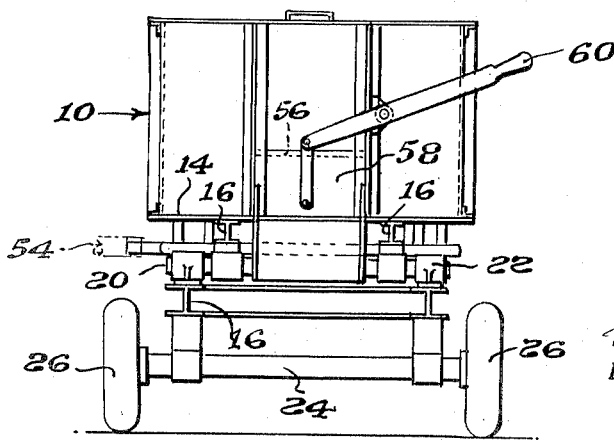
INVENTOR.
William F. Harder
BY Rowland V. Patrick
ATTORNEY

United States Patent Office 2,720,877
Patented Oct. 18, 1955

2,720,877

GARBAGE COOKING VEHICLE

William F. Harder, Lincoln, Nebr.

Application June 19, 1953, Serial No. 362,882

2 Claims. (Cl. 126—348)

The present invention relates to improved equipment for sterilizing garbage by cooking to render the same suitable for feeding to hogs.

It has only been in recent years in this country that hog growers and health authorities have felt it necessary to sterilize garbage fed to hogs. An increasing number of the states of the United States are enacting legislation requiring that garbage be sterilized, as by cooking, before feeding to hogs and hog growers are therefore faced with the problem of providing suitable equipment and methods for carrying out this operation effectively and economically.

The problem posed is to provide suitable equipment and a method of operation whereby raw garbage may be elevated in temperature to the boiling point and kept there a sufficient length of time for sterilization and thereafter distributed to feeding stations, all with the fewest possible manual and mechanical operations and with the most efficient utilization of fuel. Furthermore, studies indicate that garbage which has been cooked under pressure of live steam, as by pressure cooking, is often unpalatable to hogs and may not be eaten by them. Therefore, in order for successful sterilization to be accomplished for feeding purposes, the garbage must be boiled substantially at atmospheric pressure.

To reduce the number of operations in handling the garbage to an absolute minimum, I perform the cooking in a dump vehicle, which will hereinafter be called a wagon, which can be drawn to the various feeding stations and the cooked garbage distributed directly into the feeding troughs.

It is an object of the present invention to provide a garbage cooking and dispensing wagon having a cooking tank with internal steam piping connectable to an external source of live steam for efficiently and quickly raising the contents to boiling temperature and maintaining such temperature for the desired period without overheating and with danger of boiling over minimized.

Another object of the invention is to provide a cooking wagon of the type described embodying a closed steam heating system for permitting collection and recirculation of the condensate.

Still another object of the invention is to provide a garbage cooking wagon of the type described in which the garbage is placed in direct contact with steam heating pipes, but in which the pipes are so arranged as to minimize clogging up with garbage between or beneath the pipes and in which the pipes in no way interfere with discharging the cooked garbage from the vehicle.

A further object of the invention is to provide a simple and rugged garbage cooking wagon which requires a minimum of attention by the operator during the cooking period.

Still a further object of the invention is to provide a garbage cooking wagon of the type described which is adaptable for connection to either high or low pressure sources of steam to supply the cooking heat.

In accordance with the invention I provide a wagon or trailer type vehicle on which is mounted a cooking vat or tank pivotedly held at one location and connected to a lift at another location for tilting it to discharge the contents through an outlet in one of its walls. The floor of the tank supports a plurality of side-by-side heating pipes all extending generally toward the outlet and which are all connected to a steam header at their ends away from the outlet. The tank floor is apertured near the outlet and the pipes are turned downwardly and extend through the apertures and connect to a condensate return header which is mounted beneath the floor, the tank floor between the apertures and the outlet being smooth and flat thereby permitting unobstructed sliding of the cooked garbage toward the discharge outlet. The cooking tank is provided with a loose-fitting cover which may be put in place after the garbage has reached boiling temperature so as to make the cooking action more efficient. The discharge gate at the outlet seals itself when in a closed position by clogging with the contents, thereby preventing leakage during cooking. Desired quantities of cooked garbage may be dispensed through the gate at the feeding stations. Preferably the tank pivots at the rear end and is raised by a hoist at the front end for discharging and also to tilt the tank, if necessary, slightly during cooking to assure gravity flow of the condensate to the condensate collecting header.

Further objects, features and advantages of the invention will become apparent from the following detailed description of a preferred embodiment thereof taken in connection with the accompanying drawings in which like numerals refer to like parts in the several views, and in which, Fig. 1 is a side elevation with portions broken away of my novel garbage cooking wagon;

Fig. 2 is a plan view on line 2—2 of Fig. 1; and

Fig. 3 is a rear elevation showing the discharge gate of the cooking tank.

Referring to the drawings, the cooking operation is performed within a steam heated tank indicated generally by the numeral 10 having side walls 11, a front wall 12 and rear wall divided into sections 13ª, 13ᵇ, and 13ᶜ and preferably with welded seams and provided with vertical reinforcing ribs 15. The wall sections 13ª and 13ᶜ converge to funnel the garage toward the outlet during dumping. The floor 14 of the tank 10 is supported by a pair of longitudinally extending rails 16 which in turn rest upon a forward transverse support 18 and a rear pivot pin 20, the latter of which is mounted in journals 22 which are supported by the rear axle 24 and wheels 26.

The front end of the tank 10 may be hoisted by a hoisting device 27, such as a cable 28 which runs over a pulley 30 mounted on a post 32 and powered by any suitable means (not shown), hydraulically, for example. Other hoist arrangements may be employed, such as a hydraulic jack. The post 32 is supported on a platform 34 which in turn is supported on the front wheels 36 which are spaced from the rear wheels 26 by the frame 38. Through a suitable hitch 40, the wagon may be attached to a tractor or truck or the like for being drawn about.

Resting on the floor 14 within the tank 10 are a series of longitudinally extending heating pipes 42 which are connected into the steam header 44, as by welding. The header 44 extends transversely across the front end of the tank 10 and has an outside connection 46 permitting attachment to a steam line, as indicated by broken lines at 48 in Fig. 2. The header 46 emerges through an opening 50 in a side wall 11 of the container 10 and may be sealed in any suitable way to prevent leakage of the garbage. However, the seal preferably should be flexible to provide an expansion joint to permit the header 44 to slide forwardly when steam is admitted to the pipes 42 which will expand in length when heated.

The parallel heating pipes 42 at the rear end of the tank 10 are uniformly turned downwardly and protrude through slotted openings in the floor 14 and connect to the condensate collecting header 52 which in turn may be connected, as indicated by broken lines in Fig. 2, to a boiler condensate return line 54. By reason of aligning all the pipes 42 longitudinally of the vehicle and withdrawing their rear ends through the tank floor ahead of the discharge opening 56, and arranging the condensate return header 52 beneath the tank floor, all transverse projections, with the exception of the steam header 44, are eliminated from within the tank. Thus there is a minimum of interference with the shifting of the cooked garbage toward the discharge opening 56 when the tank is tilted by the lift mechanism.

The opening 56 is closed by a vertically moving gate 58, manually operated by a handle 60 and discharging onto a chute 62.

A loosely fitting removable cover, divided into three sections, 64$^a$, 64$^b$, and 64$^c$, closes the top of the tank 10. The cover holds in heat during cooking operations, thus making for more efficient cooking.

The operation of my novel portable cooker is as follows:

The cooking wagon may first be used to collect the raw garbage which may be dumped into the top with the cover 64$^a$, 64$^b$, and 64$^c$ removed. The vehicle is then drawn to the cooking station which is adjacent a source of steam under pressure, preferably under high pressure for more rapid cooking. The time of cooking, of course, will depend upon the nature and quantity and temperature of the raw garbage, upon the temperature of the cooking steam, and boiler capacity as well as upon the total effective area of steam heated pipes which is in contact with the garbage. These factors may be readily computed by competent heating engineers. Generally, I prefer to have the pipes 42 not more than six inches apart and lying directly in engagement with the floor 14 to prevent accumulation of garbage beneath them.

After being charged with raw garbage, water is added to the mixture to prevent scorching and to provide for the generation of steam within the mixture so that the whole mixture will boil and be heated more uniformly and rapidly. The header 44 through the connection 46 is connected to the steam line 48 and the corresponding header 52 is connected to the condensate return 54. Steam is admitted to the header 44 and hence to the pipes 42, the condensate running into the header 52 for return to the boiler. To assure gravity flow of the condensate within the pipes 42, the hoist 27 is employed to tilt the tank 10 somewhat to the rear, depending upon the slope of the ground on which the wagon is parked. The raw garbage mixture is stirred two or three times during heating, if necessary, and when it reaches the boiling point, the sectional cover 64$^a$, 64$^b$, and 64$^c$ is put in place and the garbage is boiled for at least half an hour, preferably an hour, to assure complete sterilization. Thereafter, the steam and condensate lines are disconnected and the wagon may be drawn to the various feeding stations and the cooked garbage readily discharged into feeding troughs, etc., through the opening 56 and out the chute 62.

While it is possible to perforate the pipes 42 so as to discharge live steam into the garbage mixture, for more rapid heating, I have found this to be unsatisfactory for most operations for a variety of reasons. The introduction of the steam increases the moisture content of the garbage by an amount which is not subject to control by the operator, thus causing the mixture to be more liquid than necessary and making it impossible to determine the amount of water which should initially be added. When boiling temperature is reached, the steam line must be throttled down or boiling over will occur. Furthermore, the perforations in the pipes tend to become clogged very rapidly and it is necessary to clean them frequently, a painstaking, time-consuming operation. The discharge of live steam into the garbage makes it impossible to retrieve the condensate for recirculation in the boiler. Thus fresh make-up water must be continuously added and, particularly in regions where the water is hard and must be softened with chemicals, this is expensive and also tends to reduce the life of the boiler.

By the new and improved arrangement of tank and vehicle, I eliminate several handling operations which would otherwise be necessary, namely, loading the raw garbage into a stationary cooker from a collecting vehicle and then unloading it, after cooking, into a carrier for distribution to the feeding stations. The improved cooker thoroughly, quickly and economically boils the garbage, thus assuring a complete sterilization of all portions thereof. The cooking is performed in a manner which does not interfere with the palatability of the garbage to the hogs and the operation is efficient without undue waste of fuel. Furthermore, since the cooker is adaptable for use on steam systems of a variety of pressures, it may be employed at existing installations, where steam under any degree of pressure is available, lower pressure steam merely requiring longer to reach boiling because of lower temperature.

While I have herein disclosed and described a presently preferred embodiment of the invention, it will be understood that the same is capable of numerous modifications and changes by those skilled in the art nevertheless within the scope of the appended claims.

I claim:

1. Apparatus for cooking garbage which comprises a wagon, a cooking tank mounted on said wagon for tilting toward the rear thereof, a series of imperforate steam-heating pipes arranged longitudinally in side-by-side relation on the floor of said tank, a transverse steam header within the forward end of said tank to which said pipes are connected, said floor being apertured near the rear end of said tank and the rear ends of said pipes leading down through said apertures, a condensate header beneath said floor to which said last-named ends of said pipes are connected, the rear end wall of said tank having an opening permitting discharge of the contents thereof and a gate for closing said opening, said steam header having a connection for connecting to a source of steam and said condensate header having a connection for connecting to a condensate return.

2. Apparatus for cooking garbage which comprises a wagon, a cooking tank and mountings therefor on said wagon, said mountings including a pivotal joint at the rear end of said tank and a hoist for raising the front end thereof, a series of imperforate steam pipes arranged longitudinally in general parallel spaced relation on the floor of said tank, a transverse steam header resting on said floor within the forward end of said tank to which said pipes are connected, said floor being apertured near the rear end of said tank and the rear ends of said pipes leading down through said apertures, a condensate header beneath said floor to which said last-named ends of said pipes are connected, the rear end wall of said tank having an opening permitting discharge of the contents thereof, a gate for closing said opening, an external discharge chute beneath said opening, said steam header having a connection through a side wall of said tank for connecting to a source of steam and said condensate header having a connection for connecting to a condensate return, and a removable cover for said tank.

References Cited in the file of this patent

UNITED STATES PATENTS

| | | |
|---|---|---|
| 232,154 | Taylor | Sept. 14, 1880 |
| 774,771 | Mills et al. | Nov. 15, 1904 |
| 1,903,504 | Deck | Apr. 11, 1933 |
| 1,942,207 | Ferwerda | Jan. 2, 1934 |

FOREIGN PATENTS

| | | |
|---|---|---|
| 449,352 | Great Britain | June 25, 1936 |